United States Patent

Uematsu et al.

[11] Patent Number: 5,979,156
[45] Date of Patent: Nov. 9, 1999

[54] COOLING STEAM SYSTEM FOR STEAM COOLED GAS TURBINE

[75] Inventors: Kazuo Uematsu; Hideaki Sugishita, both of Takasago, Japan

[73] Assignee: Mitsubishi Heavy Industries, Ltd., Tokyo, Japan

[21] Appl. No.: 09/030,204

[22] Filed: Feb. 25, 1998

[51] Int. Cl.[6] .................................................. F02C 6/18
[52] U.S. Cl. ..................... 60/39.141; 60/39.182
[58] Field of Search ........................ 60/39.141, 39.182, 60/39.75; 122/7 R

[56] References Cited

U.S. PATENT DOCUMENTS

| | | | |
|---|---|---|---|
| 4,424,668 | 1/1984 | Mukherjee | 60/39.182 |
| 5,412,937 | 5/1995 | Tomlinson et al. | 60/39.182 |
| 5,471,832 | 12/1995 | Sugita et al. | 60/39.182 |
| 5,628,179 | 5/1997 | Tomlinson | 60/39.182 |

FOREIGN PATENT DOCUMENTS

0743425A1  11/1996  European Pat. Off. .

74210  1/1995  Japan .

OTHER PUBLICATIONS

Patent Abstracts of Japan, Abstract for JP 06–323162, published Nov. 22, 1994, Nakamura Shozo.

Patent Abstracts of Japan, Abstract for JP 09–088519, published Mar. 31, 1997, Sakamoto Tetsuzo.

Patent Abstracts of Japan, Abstract for JP 09–209713, published Aug. 12, 1998, Nomoto Hideo.

Primary Examiner—Louis J. Casaregola

[57] ABSTRACT

A cooling steam system for a steam cooled gas turbine is configured such that a main stream of exhaust from a high pressure turbine is branched from a line leading to a reheater, and supplied as cooling steam for a high temperature moving blade and a high temperature stationary blade of the gas turbine, and the cooling steam is then recovered into an inlet area or an intermediate area of the reheater; whereby the bottoming side and the steam cooled side can be operated under preferred conditions without adverse influence on the bottoming side.

5 Claims, 2 Drawing Sheets

COOLING STEAM SYSTEM FOR STEAM COOLED GAS TURBINE

BACKGROUND OF THE INVENTION

This invention relates to a gas turbine system in which a high temperature moving blade and a high temperature stationary blade of a gas turbine are steam cooled.

FIG. 2 is a schematic system diagram of a conventional general gas turbine and a bottoming cycle.

A high temperature moving blade and a high temperature stationary blade of a gas turbine 51 are cooled with bleed air 53 from a compressor 52. A system in which steam from a bottoming cycle is used for cooling of a moving blade and/or a stationary blade of a gas turbine and returned again to the bottoming cycle has not bee put to practical use.

Outlet steam from a high pressure turbine 54 of a bottoming cycle totally enters a reheater 55, where it is heated to an appropriate temperature and supplied to an intermediate pressure turbine. A system with this constitution achieves a high efficiency.

In the drawing, a zone enclosed with a one-dot chain line represents a bottoming cycle, in which the numeral 56 denotes an intermediate pressure turbine, 57 a low pressure turbine, 58 a condenser, 59 a feed water pump, and 60 an exhaust gas boiler.

With the existing equipment, as noted above, cooling of the gas turbine is usually performed with air. Recently, however, the idea of using steam from the bottoming cycle for cooling of the gas turbine instead of air cooling has been introduced in accordance with the high temperature operation of the gas turbine.

As described above, steam cooling methods for the gas turbine have been introduced here and there. However, all of these methods are still at a trial-and-error stage, and involve many unresolved issues in order to emerge as actual machines.

Take, as an example, a steam cooled gas turbine system in which a moving blade or a stationary blade of a gas turbine is cooled with steam supplied from the bottoming cycle side, and this steam is recovered and returned again to the bottoming side for an improvement in efficiency or output. In this system, a considerable amount of steam that has so far flowed in the bottoming flows into the gas turbine during movement between the gas turbine and the bottoming cycle. Thus, a marked influence is exerted on each other.

SUMMARY OF THE INVENTION

The present invention is aimed at solving these problems with earlier technologies. Its object is to provide a cooling steam system capable of starting, operating and stopping individual subsystems under optical conditions.

The present invention for attaining this object provides a cooling steam system for a steam cooled gas turbine in a combined power plant which comprises a combination of a gas turbine plant and a steam turbine plant, and includes an exhaust heat recovery boiler for generating steam turbine driving steam by utilizing exhaust heat from a gas turbine; wherein a main stream of exhaust from a high pressure turbine is branched from a line leading to a reheater, and supplied as cooling steam for a high temperature moving blade and a high temperature stationary blade of the gas turbine, and steam having cooled the high temperature moving blade and the high temperature stationary blade is introduced into an inlet area or an intermediate area of the reheater.

As noted above, the region to be cooled is restricted to the high temperature moving blade and the high temperature stationary blade, the main part of the gas turbine. The coolant for them is the main stream of exhaust from the high pressure turbine which is in a sufficient amount. Thus, the main part of the gas turbine can be cooled reliably, and the heat of these high temperature portions can be fully taken up into the cooling steam.

Furthermore, this cooling steam after cooling the high temperature portions is introduced into the inlet area or intermediate area of the reheater so that it can be heat-adjusted by the reheater. Thus, the temperature rise of the cooling steam can be diminished by increasing the flow rate, or decreasing the flow velocity, of the cooling steam.

The smallness of the temperature rise results in the smallness of a pressure change which is proportional to a temperature change. In other words, a pressure loss can be curtailed. In cooling a blade to be cooled, there is need to deprive it of a certain amount of heat. Based on a design for depriving this certain amount of heat, assume that the flow rate of cooling steam is increased to drop its temperature. In this condition, the flow velocity will go up and increase heat transfer. Hence, the flow rate area should be enlarged, and the number of channels should be decreased. As a result, the channel length is shortened, and the pressure loss is decreased.

The present invention also provides the cooling steam system for a steam cooled gas turbine, in which an intermediate pressure bypass line is provided for further branching the main stream of exhaust from the high pressure turbine from the line leading to the reheater so as to be directly connected to exhaust from an intermediate pressure turbine, whereby communication of the intermediate pressure bypass line to the high pressure turbine and the intermediate pressure turbine can be established at the start of the system.

When the system is started, but steam from the exhaust heat recovery boiler is not evaporated, steam supply to the steam turbine is stopped. A path ranging from the high pressure turbine to the downstream intermediate pressure turbine via the reheater is also cut off from steam supply. However, turbine rotation at the start of the system causes air agitation within the turbine, which in turn causes windage loss. Thus, the exhausts from the respective turbines are connected together by the intermediate pressure bypass line to create an open space for preventing the windage loss.

The present invention also provides the cooling steam system for a steam cooled gas turbine, wherein a steam supply system of an auxiliary boiler is connected to the inlet side of a cooling steam supply system for the high temperature moving blade and the high temperature stationary blade of the gas turbine so that steam is supplied from the auxiliary boiler at the start of the system.

That is, at the start of the system, steam on the bottoming side does not satisfy adequate conditions (flow rate, pressure, temperature, etc.) for a certain period of time. During this period, a gas turbine combustion gas must be prevented from penetrating the cooling steam passage in the high temperature moving blade or stationary blade and rotor of the gas turbine. For this purpose, the auxiliary boiler is provided to supply appropriate steam.

The present invention also provides the cooling steam system for a steam cooled gas turbine, wherein an air supply system from a control air or gas turbine bleed air system is connected to the inlet side of a cooling steam supply system for the high temperature moving blade and the high temperature stationary blade of the gas turbine so that air is supplied from the air supply system at the stoppage of the system.

That is, at the stoppage of the system, steam must be prevented from remaining in the cooling steam passage in the gas turbine high temperature moving blade or stationary blade and rotor. For this purpose, control air or gas turbine bleed air is supplied to the passages.

The present invention also provides the cooling steam system for a steam cooled gas turbine, wherein a purge line is provided for causing the outlet side of the cooling steam supply system for the high temperature moving blade and the high temperature stationary blade of the gas turbine to communicate with an exhaust system of the exhaust heat recovery boiler so that residues of the cooling steam supply system are purged at the start or stoppage of the system.

That is, as stated previously, steam from the auxiliary boiler is injected to drive away air remaining in the cooling steam passage at the start of the system. Also, control air or gas turbine bleed air is supplied to remove steam remaining in the cooling steam passage at the stoppage of the system. Such steam and control air or gas turbine bleed air are discharged to the exhaust system of the exhaust heat recovery boiler by providing the purge line.

DETAILED DESCRIPTION OF THE PREFERRED EMBODIMENTS

Figure 1:
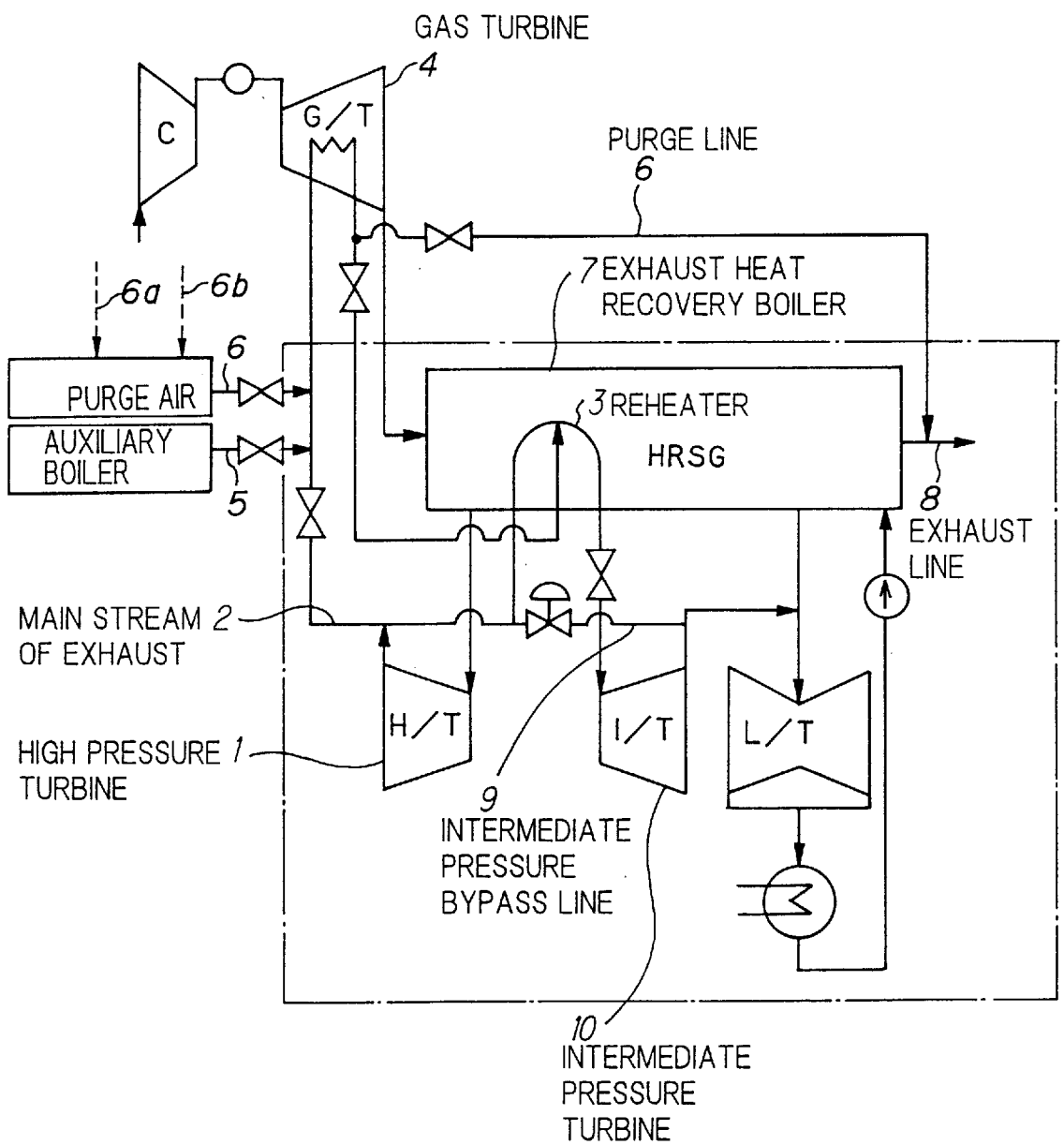
FIG. 1 is a diagram of a cooling steam system for a steam cooled gas turbine concerned with an embodiment of the present invention.
Figure 2:
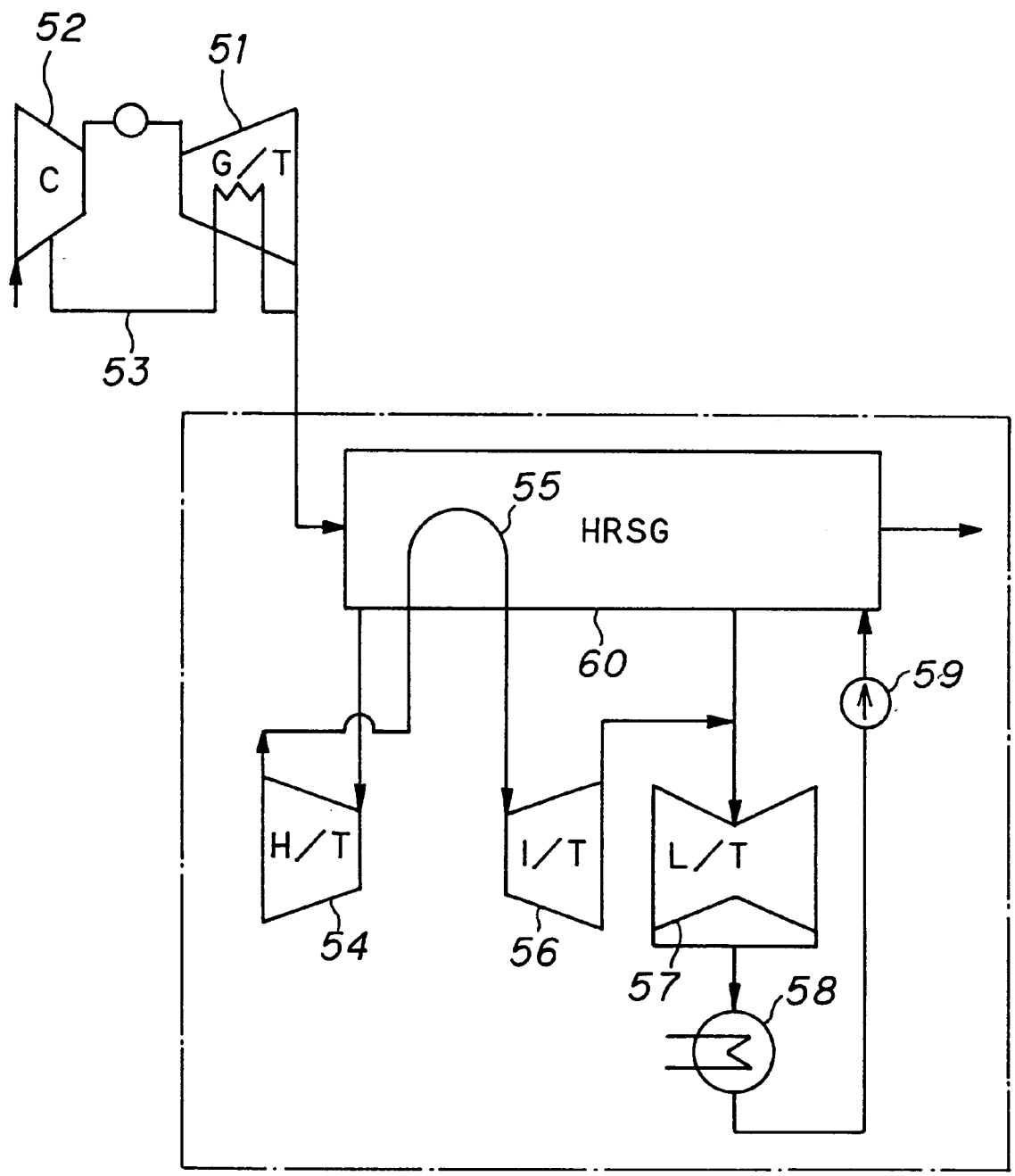
FIG. 2 is a diagram of a conventional cooling system for a gas turbine.

An embodiment of the present invention will now be described with reference to FIG. 1.

In a cooling steam system, a main stream 2 of exhaust from a high pressure turbine 1 is branched from a line leading to a reheater 3, and used as cooling steam for a high temperature moving blade and a high temperature stationary blade of a gas turbine 4.

Recovered steam used for the cooling of the high temperature moving blade and the high temperature stationary blade of the gas turbine 4 is returned to an inlet area or an intermediate area of the reheater 3 (the drawing shows an example of return to the intermediate area) depending on the degree of its heating at the cooled area. In the reheater 3, the steam is adjusted to optimal steam temperature for an intermediate pressure turbine 10, and put to use.

While steam on the bottoming side (the region surrounded by the one-dot chain line) is not satisfying adequate conditions, such as flow rate, pressure and temperature, at the start of the system, steam supply to the turbine is stopped. Thus, no steam is present in the high pressure turbine 1. Nor is there any steam in the cooling steam passage of its exhaust system.

To prevent a gas turbine combustion gas or the like from penetrating the cooling steam passage in the high temperature moving blade or stationary blade and rotor of the gas turbine 4 during this period, a line 5 is provided for supplying appropriate steam from an auxiliary boiler to the inlet side of the steam cooling passage.

Before start of the system, air exists in the cooling steam passage. When auxiliary boiler steam is injected, the steam mixes with air. To prevent this steam from flowing into the bottoming side, a purge line 6 is provided on the outlet side of the cooling steam passage, so that purged air is discharged to an exhaust line 8 of an exhaust heat recovery boiler 7.

Generally, with a cooling steam system, when steam from the exhaust heat recovery boiler 7 has not evaporated at the start of the system, steam supply to the steam turbine is stopped. A path ranging from the high pressure turbine 1 to the downstream intermediate pressure turbine 10 via the reheater 3 is also cut off from steam supply. However, turbine rotation at the start of the system causes air agitation within the turbine, which in turn causes windage loss.

In the instant embodiment, however, an intermediate pressure bypass line 9 for directly connecting the exhaust side of the high pressure turbine 1 to the exhaust side of the intermediate pressure turbine 10 is provided in order to prevent windage loss in the intermediate pressure turbine 10 and a subsequent turbine. Thus, the exhausts from the respective turbines are connected together to create an open space for preventing the windage loss.

At the stoppage of the above-described embodiment having the cooling steam system, air lines 6a, 6b for supplying control air or gas turbine bleed air to the cooling steam passage in the gas turbine high temperature moving blade or stationary blade and rotor are provided for preventing steam from remaining in the cooling steam passage.

In the instant embodiment that gives consideration to the situations at the start and stoppage of the system, the foregoing contrivances take effect even when implemented singly. However, when used in combination, they can be expected to show a greater effect because of the increased efficiency and output of the gas turbine.

According to the above-described cooling steam system for a steam cooled gas turbine as the first aspect of the present invention, cooling steam for supply to the steam cooled gas turbine can be secured in an appropriate, adequate amount. Moreover, recovered steam is returned to the reheater. Thus, steam of appropriate temperature can be fed to the intermediate pressure turbine, and pressure loss can be decreased.

According to the second aspect of the invention, exhausts from the high pressure and intermediate pressure turbines are connected together by the intermediate pressure bypass line to create an open space. Thus, the occurrence of windage loss at the start of the system can be prevented.

According to the third aspect of the invention, steam is supplied from the auxiliary boiler to the cooling steam supply system at the start of the invented system. Thus, the safety of the cooling steam supply system can be ensured.

According to the fourth aspect of the invention, control air or gas turbine bleed air is utilized at the stoppage of the system to drive away air remaining in the cooling air supply system. Thus, the occurrence of rust or the like due to the remaining steam is prevented.

According to the fifth aspect of the invention, the steam from the auxiliary boiler or the control air or gas turbine bleed air, which has been supplied to the cooling air supply system, is delivered to the exhaust system of the exhaust heat recovery boiler through the purge line for subsequent treatment. Thus, the safety and stability of the invented system are markedly improved.

While the present invention has been described with reference to the illustrated embodiment, it is to be understood that the invention is not restricted thereby, but various changes and modifications may be made in the concrete structure of the invention without departing from the spirit and scope of the invention.

We claim:

1. A cooling steam system for a steam cooled gas turbine in a combined power plant which comprises a combination of a gas turbine plant and a steam turbine plant, and includes an exhaust heat recovery boiler for generating steam turbine driving steam by utilizing gas turbine exhaust heat; wherein a main stream of exhaust from a high pressure turbine is branched from a line leading to a reheater, and supplied as cooling steam for a high temperature moving blade and a high temperature stationary blade of the gas turbine, and steam having cooled the high temperature moving blade and the high temperature stationary blade is introduced into an inlet area or an intermediate area of the reheater.

2. A cooling steam system for a steam cooled gas turbine as claimed in claim 1, wherein an intermediate pressure bypass line is provided for further branching the main stream of exhaust from the high pressure turbine from the line leading to the reheater so as to be directly connected to exhaust from an intermediate pressure turbine, whereby communication of the intermediate pressure bypass line to the high pressure turbine and the intermediate pressure turbine can be established at the start of the system.

3. A cooling steam system for a steam cooled gas turbine as claimed in claim 1, wherein a steam supply system of an auxiliary boiler is connected to the inlet side of a cooling steam supply system for the high temperature moving blade and the high temperature stationary blade of the gas turbine so that steam is supplied from the auxiliary boiler at the start of the system.

4. A cooling steam system for a steam cooled gas turbine as claimed in claim 1, wherein an air supply system from a control air or gas turbine bleed air system is connected to the inlet side of a cooling steam supply system for the high temperature moving blade and the high temperature stationary blade of the gas turbine so that air is supplied from the air supply system at the stoppage of the system.

5. A cooling steam system for a steam cooled gas turbine as claimed in claim 3 or 4, wherein a purge line is provided for causing the outlet side of the cooling steam supply system for the high temperature moving blade and the high temperature stationary blade of the gas turbine to communicate with an exhaust system of the exhaust heat recovery boiler so that residues of the cooling steam supply system are purged at the start or stoppage of the system.

* * * * *